US009114888B2

(12) United States Patent
Swearingen et al.

(10) Patent No.: US 9,114,888 B2
(45) Date of Patent: Aug. 25, 2015

(54) RAM AIR TURBINE SMOKE ISOLATION

(75) Inventors: Paul Swearingen, Rockford, IL (US); Scott J. Marks, Oregon, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 713 days.

(21) Appl. No.: 13/402,474

(22) Filed: Feb. 22, 2012

(65) Prior Publication Data
US 2013/0214589 A1 Aug. 22, 2013

(51) Int. Cl.
*B60L 1/00* (2006.01)
*B60L 3/00* (2006.01)
*H02G 3/00* (2006.01)
*B64D 41/00* (2006.01)
*B64D 45/00* (2006.01)

(52) U.S. Cl.
CPC ........ *B64D 41/007* (2013.01); *B64D 2045/009* (2013.01)

(58) Field of Classification Search
None
See application file for complete search history.

(56) References Cited

U.S. PATENT DOCUMENTS

| 5,263,662 | A | 11/1993 | Fowler et al. |
| 6,346,892 | B1 | 2/2002 | DeMers et al. |
| 7,805,947 | B2 | 10/2010 | Moulebhar |
| 2006/0260323 | A1 | 11/2006 | Moulebhar |
| 2010/0300117 | A1 | 12/2010 | Moulebhar |
| 2012/0013177 | A1* | 1/2012 | Krenz et al. ............. 307/9.1 |

* cited by examiner

*Primary Examiner* — Jared Fureman
*Assistant Examiner* — Aqeel Bukhari
(74) *Attorney, Agent, or Firm* — Cantor Colburn LLP

(57) ABSTRACT

An electrical power generation and distribution system includes a RAM air turbine a first direct current essential bus, a second direct current essential bus, a third direct current essential bus, a first contactor disposed between the first and third direct current essential buses, a second contactor disposed between the second and third direct current essential bus, a third contactor disposed between the RAM air turbine and the third direct current essential bus, a RAM air turbine smoke isolation system, including a first drive circuit coupled to the first contactor, a second drive circuit coupled to the second contactor, a third drive circuit coupled to the third contactor and a transfer inhibit switch coupled to the first, second and third drive circuits.

20 Claims, 3 Drawing Sheets

RAM AIR TURBINE SMOKE ISOLATION

BACKGROUND OF THE INVENTION

The present invention is related to emergency power systems and in particular to emergency power systems employed on aircraft in order to isolate smoke related to failed power sources.

Aircraft applications rely on electrical power distribution systems to power a variety of critical systems on the aircraft. Reliable and redundant distribution of electrical power is required to ensure the availability of critical systems. For example, a particular aircraft application may include main generators associated with each of the main engines, an auxiliary power unit (APU), and a RAM air turbine (RAT) generator. During normal operations, power is supplied by the main generators and/or the APU. The RAT is deployed in emergency conditions to compensate for a lack of power available from traditional sources.

BRIEF DESCRIPTION OF THE INVENTION

Exemplary embodiments include an electrical power generation and distribution system, including a RAM air turbine, a first direct current essential bus, a second direct current essential bus, a third direct current essential bus, a first contactor disposed between the first and third direct current essential buses, a second contactor disposed between the second and third direct current essential bus, a third contactor disposed between the RAM air turbine and the third direct current essential bus, a RAM air turbine smoke isolation system, including a first drive circuit coupled to the first contactor, a second drive circuit coupled to the second contactor, a third drive circuit coupled to the third contactor and a transfer inhibit switch coupled to the first, second and third drive circuits.

Additional exemplary embodiments include RAM air turbine smoke isolation system, including a first drive circuit configured to be coupled to a first contactor, a second drive circuit configured to be coupled to a second contactor, a third drive circuit configured to be coupled to a RAM air turbine line contactor and a transfer inhibit switch coupled to the first, second and third drive circuits, the transfer inhibit switch including a normal setting, a main setting and a spring-loaded essential setting.

Further exemplary embodiments include a method for aircraft smoke isolation, the method including generating a smoke clearing signal from a transfer inhibit switch that is coupled to a RAM air turbine line contactor, in response to the smoke clearing signal, closing a RAM air turbine line contactor coupled to the transfer inhibit switch, and in response to a generation of deploy awake signal, overriding the transfer inhibit switch, and maintaining the RAM air turbine line contactor in a closed position.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
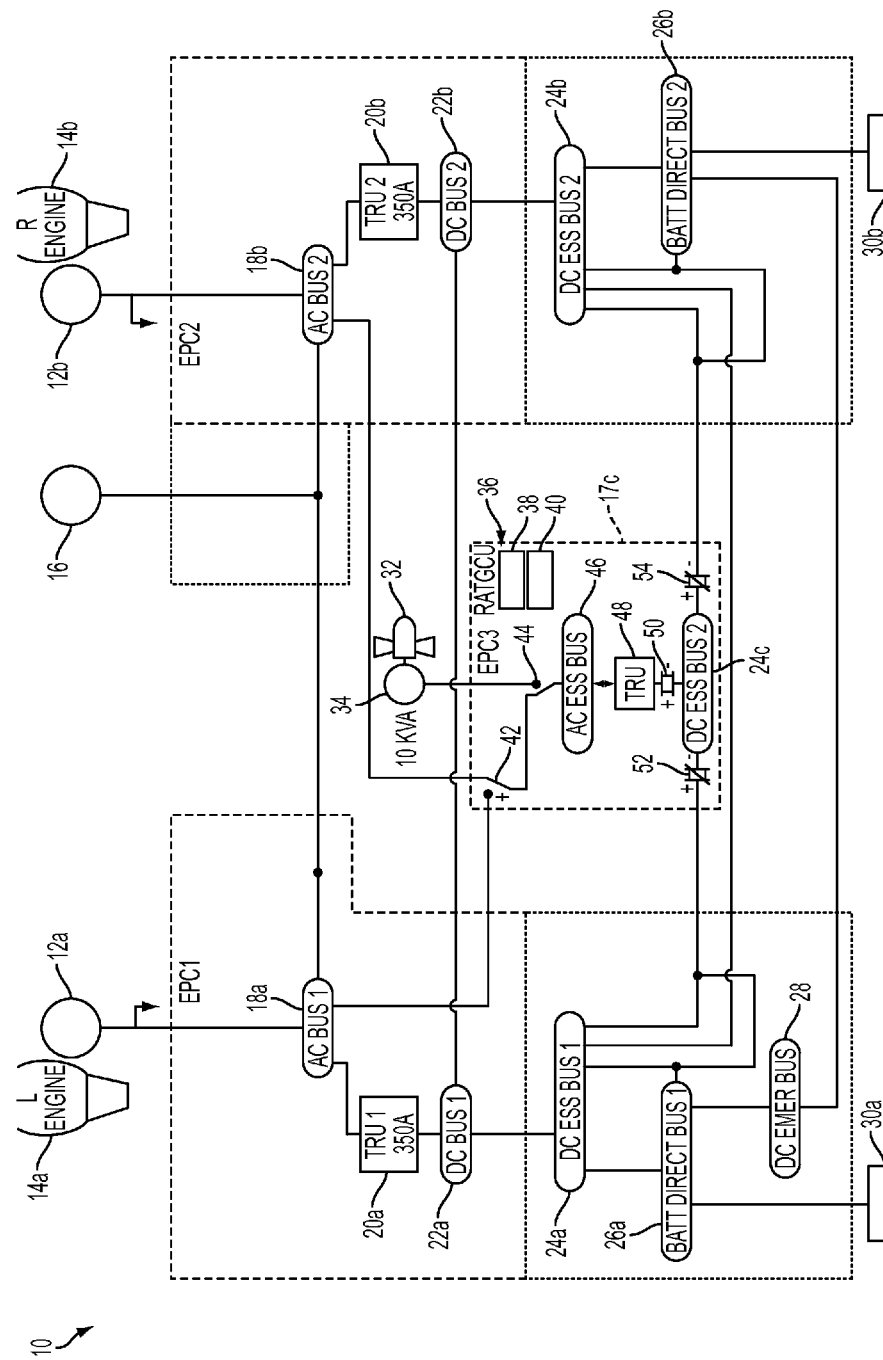
FIG. 1 is a single line circuit diagram of an exemplary electrical power generation and distribution system.

FIG. 1 is a single line circuit diagram of electrical power generation and distribution system (EPGDS) 10. Electric power is supplied to EPGDS 10 by various power sources including but not limited to variable frequency generators (VFG) 12a and 12b associated with main engines 14a and 14b, respectively, and auxiliary power unit (APU) 16.

Power is distributed around the aircraft to various loads (not shown) via electric power centers EPC1, EPC2, and EPC3. Electric power center EPC1 includes first AC bus 18a, transformer rectifier unit (TRU) 20a, first DC bus 22a, first DC essential bus 24a, first battery direct bus 26a, and DC emergency bus 28. Electric power center EPC2 includes second AC bus 18b, transformer rectifier unit (TRU) 20b, second DC bus 22b, second DC essential bus 24b, and second battery direct bus 26b. Both electric power centers EPC1 and EPC2 include a plurality of contactors and at least one controller for selectively connecting the AC and DC buses together in various configurations based on available power to provide a highly reliable system. The single line diagram illustrates the distribution of power between various EPCs, and does not reflect power source interconnects internal to each EPC (i.e., operational power employed by circuitry and controllers to operate each EPC).

Emergency power is supplied via deployment of RAT 32 and electric power generated by RAT generator 34. Emergency power is distributed via electric power center EPC3, which includes RAT generator control unit (GCU) 36, which is responsible for controlling the various relays and contactors to control the distribution of power through electric power center EPC3. In the embodiment shown in FIG. 1, RAT GCU 36 includes RAT generator controller 38 and emergency power controller (EMPC) 40, relay 42 and RAT line contactor (RLC) 44, AC essential bus 46, TRU 48, contactors 50, 52, and 54, and third DC essential bus 24c.

In the embodiment shown in FIG. 1, electric power center EPC1 receives alternating current (AC) power from VFG 12a for distribution via AC bus 18a. AC power is selectively distributed from AC bus 18a to various loads (not shown), electric power center EPC2 via one or more contactors (not shown), TRU 20a for conversion to a DC output, and to electric power center EPC3. TRU 20a converts the AC power supplied by AC bus 18a to a DC output that is selectively distributed via DC bus 22a to various DC loads (not shown), to DC essential bus 24a, and to DC bus 22b. Likewise, electric power center EPC2 receives AC power from VFG 12b for distribution via AC bus 18b. AC power is selectively distributed from AC bus 18b to various loads (not shown), electric power center EPC2 via one or more contactors (not shown), TRU 20b for conversion to a DC output, and to electric power center EPC3. TRU 20b converts the AC power supplied by AC bus 18b to a DC output that is selectively distributed via DC bus 22b to various DC loads (not shown), to DC essential bus 24b, and to DC bus 22a (redundant backup to DC bus 22a).

First and second DC essential buses 24a and 24b supply power to essential DC loads (not shown). In addition to redundancy between DC buses 22a and 22b, redundancy is provided between first and second DC essential buses 24a and 24b to ensure power is always available to essential loads. For example, in addition to DC power provided via first DC bus 22a, first DC essential bus 24a may receive power from battery source 30a, from second DC essential bus 24b, or from third DC essential bus 24c. Likewise, first DC essential bus 24a may distribute or source power to third DC essential bus 24c, second DC essential bus 24b, and/or battery 30a for charging of the battery. Second DC essential bus 24b is also connected to receive and/or distribute power to third DC essential bus 24c, battery source 30b, and/or first DC essential bus 24a.

With respect to electric power center EPC3, during normal operation power is supplied to AC essential bus 46 from either first AC bus 18a or second AC bus 18b via switch 42. AC essential bus 46 distributes AC power to various loads (not shown) as well as to TRU 48 for conversion to DC power that is supplied via contactor 50 for distribution on third DC essential bus 24c. RAT 32 remains un-deployed during normal operation, and therefore RAT generator 34 does not provide any electrical power. RAT generator controller (RGC) 38, which is responsible for providing regulation, protection, control, built-in test (BIT) and quantification of operating parameters associated with the RAT generator, is active only during operation of RAT 32 (i.e., during emergency operations). EMPC 40, on the other hand, acts as an AC and DC essential bus manager via contactors 50, 52, and 54, switches 42 and RLC 44, and determines based on monitored voltage levels whether or not to deploy RAT 32. As such, EMPC 40 functions during all modes of operation (i.e., normal and emergency) and must remain powered even in view of emergency loss of power.

Figure 2:
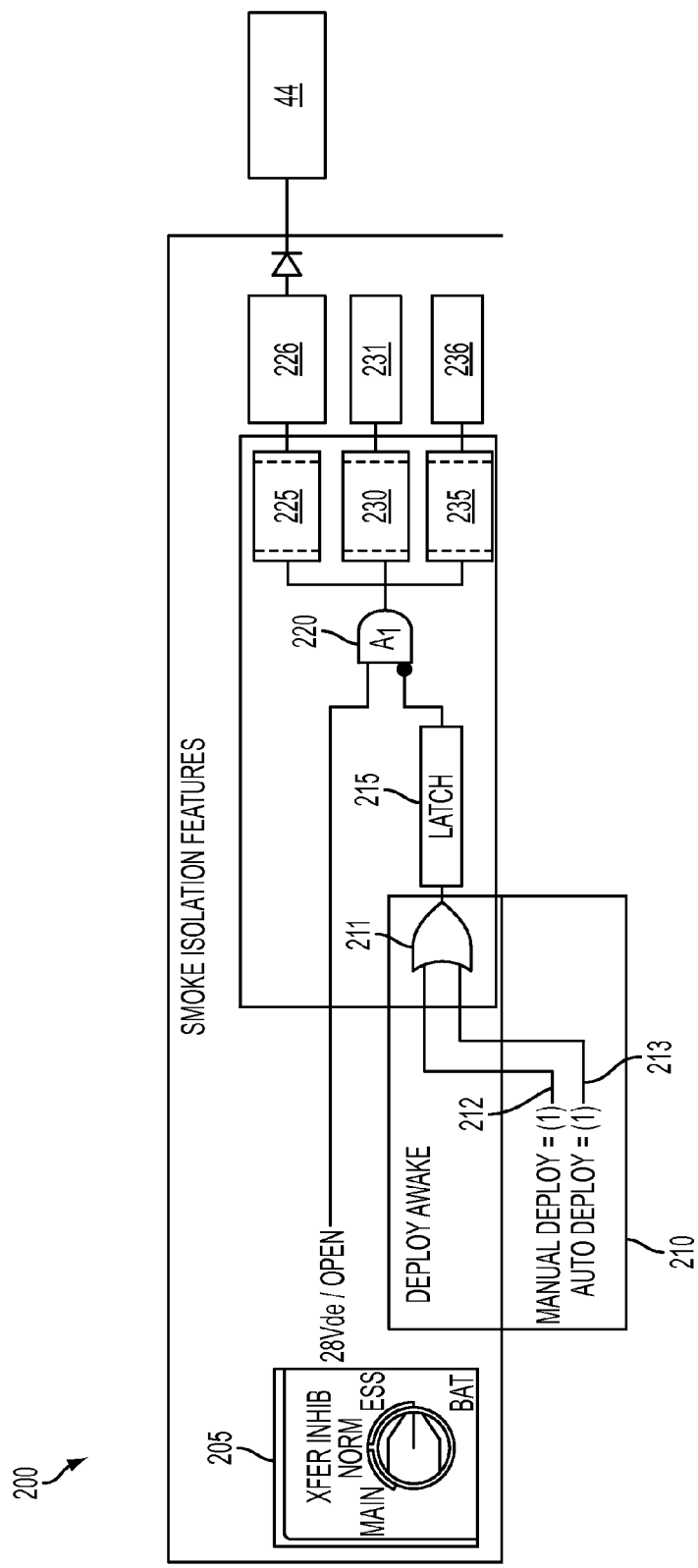
FIG. 2 illustrates an exemplary smoke isolation system that can be implemented with the exemplary electrical power generation and distribution system of FIG. 1.

In one embodiment, smoke isolation conditions and procedures can be implemented by the flight crew to segregate systems, power sources and buses to evaluate and extinguish possible fire sources and emissions. FIG. 2 illustrates an exemplary smoke isolation system 200 that can be implemented with the EPGDS 10 of FIG. 1. The system 200 can be implemented to isolate any power source or any bus from its power source. When smoke procedures are enacted by the crew, the system 200 prevents transfer of another power source to that bus that is being isolated. The system 200 includes a transfer inhibit (pilot control) switch 205 that can be manually enabled in order to isolate smoke from one or more of the power sources as described herein. The system 200 further includes a deploy awake circuit 210 that includes an or-gate 211 having a manual deploy input 212 that can be manually enabled to indicate that one or more of the power sources are to be isolated and an automatic deploy input 213 that can be automatically enabled to indicate that one or more of the power sources are to be isolated. The system 200 further includes a latch circuit 215 to latch the output of the or-gate 211 to hold the deploy signal priority. The system 200 further includes an and-gate 220 with the output of the transfer inhibit switch 205 and the latch circuit 215 as inputs. The output of the latch circuit 215 is inversed at the and-gate 220. The output of the and-gate 220 is coupled to delay modules 225, 230, 235, which generate a delay to signal a respective drive circuit 226, 231, 236 to open/close contactors 50, 52, and 54 upon activation of smoke isolation as further described herein.

In one embodiment, the transfer inhibit switch 205 is a three position switch. A normal position is a default position in which the transfer inhibit switch 205 does not generate a logic output indicating a smoke isolation condition. The transfer inhibit switch 205 also includes a main and an essential (ESS) position. In one embodiment, the main setting is spring activated and configured to return to the normal position after a pre-configured time period. In one embodiment, the ESS position is not spring-loaded and configured to remain in the ESS position until manually removed. When placed into either of the main and ESS positions, a logic "1" (i.e., smoke clearing signal) is generated at the and-gate 220. In response to the smoke clearing signal, the RLC 44 is commanded to the emergency power position connecting to the RAT generator 34. This sequence also opens the contactors 52, 54. The RLC 44 remains open so long as the inhibit transfer switch is in one of the main and ESS positions or if an emergency activation of the RLC 44 is invoked. The emergency activation of the RLC 44 is invoked by the deploy-awake circuit 210 as described herein. In one embodiment, the emergency activation of the RLC 44 has priority over the activation of the output of the inhibit transfer switch 205. Once the deploy-awake circuit 210 is activated, the transfer inhibit switch 205 is locked out from driving the RLC 44. In one embodiment, upon removal of the smoke clearing signal from the transfer inhibit switch 205, the RLC 44 is closed back to the normal operating state, and the contactors 52, 54 are closed back to a normal operating state.

Figure 3:
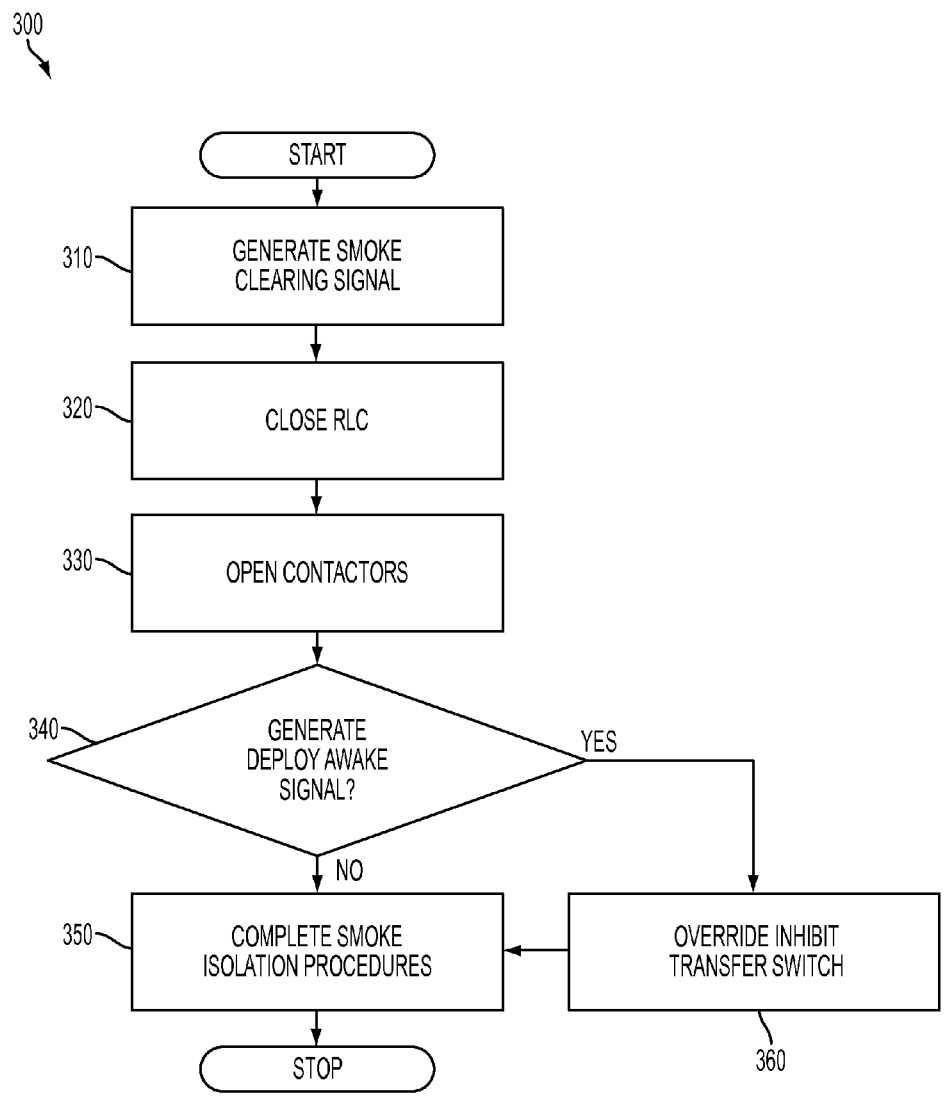
FIG. 3 illustrates a flowchart of a method for aircraft smoke isolation in accordance with one embodiment.

FIG. 3 illustrates a flowchart of a method 300 for aircraft smoke isolation in accordance with an exemplary embodiment. At block 310, the system 200 generates a smoke clearing signal from one of the main and ESS settings of the transfer inhibit switch 205. At block 320, in response to the smoke clearing signal, the RLC 44 is closed to the emergency power state, and at block 330, the contactors 52, 54 are open. At block 340, if a deploy-awake signal is generated in the deploy-awake circuit 210, then at block 360, the inhibit transfer switch 205 is overridden as described herein. The deploy-awake signal transfers control of RLC 44 and contactor 52 and 54 to the GCU 36. Regardless of the generation of the deploy-awake signal at block 340, the smoke isolation procedures are complete at block 350.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical power generation and distribution system, comprising:
  a RAM air turbine (RAT);
  a first direct current (DC) essential bus;
  a second DC essential bus;
  a third DC essential bus;
  a first contactor disposed between the first and third DC essential buses;
  a second contactor disposed between the second and third DC essential bus;
  a third contactor disposed between the RAT and the third DC essential bus;
  a RAT smoke isolation system, including:
    a first drive circuit coupled to the first contactor;
    a second drive circuit coupled to the second contactor;
    a third drive circuit coupled to the third contactor; and
    a transfer inhibit switch coupled to the first, second and third drive circuits, wherein the at least one of the first contactor and the second contactor is switched to an open position to prevent transfer of electrical power to the respective one of the first essential bus and the second essential bus in response to a smoke clearing signal from the transfer inhibit switch.

2. The system as claimed in claim 1 wherein the third contactor is a RAT line contactor (RLC).

3. The system as claimed in claim 2 further comprising a deploy-awake circuit coupled to the first, second and third drive circuits.

4. The system as claimed in claim 3 wherein the deploy-awake circuit comprises an or-gate having a manual deploy input and an auto-deploy input.

5. The system as claimed in claim 3 further comprising an and-gate disposed between the transfer inhibit switch and the first, second and third drive circuits.

6. The system as claimed in claim 5 wherein the and-gate is disposed between the deploy-awake circuit and the first, second and third drive circuits.

7. The system as claimed in claim 6 wherein the deploy-awake circuit is configured to override the transfer inhibit switch.

8. The system as claimed in claim 7 further comprising a latch circuit disposed between the deploy-awake circuit and the and-gate.

9. The system as claimed in claim 2 wherein the first drive circuit is configured to open the first contactor in response to a logic signal from the transfer inhibit switch, thereby isolating the first DC essential bus.

10. The system as claimed in claim 9 wherein the second drive circuit is configured to open the second contactor in response to the logic signal from the transfer inhibit switch, thereby isolating the second DC essential bus.

11. The system as claimed in claim 10 wherein the third drive circuit is configured to close the second contactor in response to the logic signal from the transfer inhibit switch, thereby coupling the RAT to the third essential bus.

12. The system as claimed in claim 1 wherein the transfer inhibit switch includes a normal setting, a main setting and a essential setting, the transfer inhibit switch being configured to automatically change from the main setting to the normal setting after a predetermined amount of time.

13. A RAM air turbine (RAT) smoke isolation system, comprising:
a first drive circuit configured to be coupled to a first contactor, the first drive circuit including a first delay module, the first drive circuit being configured to open the first contactor and prevent the transfer of electrical power in response to a smoke clearing signal;
a second drive circuit configured to be coupled to a second contactor, the second drive circuit including a second delay module, the second drive circuit being configured to open the second contactor and prevent the transfer of electrical power in response to the smoke clearing signal;
a third drive circuit configured to be coupled to a RAT line contactor (RLC), the third drive circuit including a third delay module, the third drive circuit configured to close the RAT RLC in response to a smoke clearing signal; and
a transfer inhibit switch coupled to the first, second and third drive circuits, the transfer inhibit switch including a normal setting, a main setting and an essential setting, wherein the transfer inhibit switch is configured to transmit the smoke clearing signal in response to the transfer inhibit switch being moved to the main setting or the essential setting, the transfer switch further being configured to move from the main setting to the normal setting after a predetermined amount of time.

14. The system as claimed in claim 13 further comprising a deploy-awake circuit coupled to the first, second and third drive circuits, the transfer inhibit switch being locked out in response to the activation of the deploy-awake circuit.

15. The system as claimed in claim 14 wherein the deploy-awake circuit comprises an or-gate having a manual deploy input and an auto-deploy input.

16. The system as claimed in claim 14 wherein the deploy-awake circuit is configured to override the transfer inhibit switch.

17. The system as claimed in claim 15 further comprising an and-gate disposed between the transfer inhibit switch and the first, second and third drive circuits.

18. The system as claimed in claim 17 wherein the and-gate is disposed between the deploy-awake circuit and the first, second and third drive circuits.

19. A method for aircraft smoke isolation, the method comprising:
generating with a manually activated switch a smoke clearing signal from a transfer inhibit switch that is coupled to a RAT line contactor (RLC), the manually activated switch having a normal setting, a main setting and an essential setting;
in response to the smoke clearing signal, closing the RLC coupled to the transfer inhibit switch;
in response to a generation of deploy awake signal, overriding the transfer inhibit switch, and transferring control to a RAT generator controller (RGC); and
moving the manually activated switch from the main setting to the normal setting after a predetermined amount of time.

20. The method of claim 19 further comprising delaying the closing of the RLC with a delay module operably coupled to the manually activated switch.

* * * * *